Dec. 15, 1936.   O. H. WICANDER   2,063,901
WINDOW HAVING PANES OF CELLULOSE ACETATE, CELLOPHANE AND THE LIKE
Filed Sept. 12, 1935
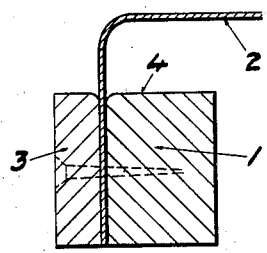
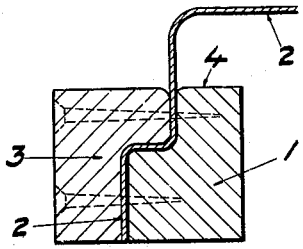
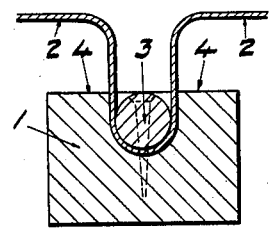
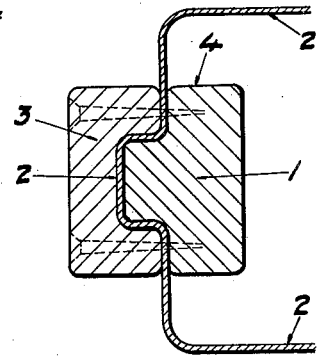

UNITED STATES PATENT OFFICE 2,063,901

WINDOW HAVING PANES OF CELLULOSE ACETATE, CELLOPHANE, AND THE LIKE

Olof Hjalmar Wicander, Osmo, Sweden

Application September 12, 1935, Serial No. 40,327
In Sweden July 10, 1934

5 Claims. (Cl. 20—56)

My present invention relates to the manufacture of membranes of cellulose acetate, Cellophane or the like, especially for use as windowpanes for greenhouses, hot-beds and the like.

Membranes of this type would be suitable for use as window-panes due to their great tensile strength but they suffer from certain drawbacks which limit their use for this purpose. The membranes have a tendency of expanding and contracting at varying temperatures and degrees of moisture. Further they are liable to shrink in the same manner as fabric. A membrane delivered from the factory may undergo a very great shrinkage amounting up to 3 centimeter per meter. A window which has been manufactured in moist weather, e. g. in autumn, and from an un-shrunk membrane which is stretched when applied to the corresponding frame will break in spring, when the membrane shrinks in dry weather.

An object of my invention is to provide a method for shrinking membranes of cellulose acetate, Cellophane and the like before said membranes are used for window-panes which method eliminates the risk of the membrane being warped or breaking due to subsequent shrinkage.

For this object the membrane is placed between two heated plates which are laid onto the two surfaces of the membrane, the surfaces of the plates facing the membrane being covered with a layer of a porous, elastic and, preferably, heat-insulating material, as for instance cork. Pressure may be applied to the plates, but this pressure must not be too great, as otherwise the heated and soft material cannot contract, nor too small as otherwise the material may be warped. The external surfaces of the plates may be heated by hot air, electric heating elements or in any other manner.

Another object of my invention is to provide an apparatus for carrying out this method, comprising a plane press having two pressing plates which may be provided with electric heating means and which on their pressing surfaces facing the membrane are covered by a thin cork layer.

The fitting of such membranes in corresponding frames or casements involves considerable difficulties, as the membranes are liable to get damaged, especially by fraying at their edges, and also on account of their above-said tendency of expanding and contracting at varying temperature and moisture.

It is another object of my invention to provide a window having a pane of a membrane of the type described, said membrane being fitted into the frame in such a manner that simultaneously as the surface of the membrane is stretched plane the membrane is permitted to expand and contract while its edges are prevented from fraying.

To this end according to my invention the membrane in shrunk state is clamped to the frame and at its places of fixation bent substantially perpendicular to the window surface. To permit expansion and contraction of the membrane a portion of same is left between the part of the membrane forming the window-pane and the part thereof clamped to the frame.

My invention may be applied when fixing the membrane along its edges as well as when fixing same at an arbitrary portion of its surface. In the latter case the membrane on opposite sides of the list or the like securing same in position is bent substantially perpendicular to the window surface and has an expansion portion between its part forming the window surface and the part clamped to the frame.

The invention may to advantage be applied to windows having double membranes, a membrane being according to the principles of the invention stretched on each side of the frame so as to form an insulating air space between the membranes.

On the accompanying drawing four different manners for the fixation of the membrane according to the invention are shown in Figs. 1 to 4.

In the figures 1 is the framework, 2 the flexible transparent membrane, 3 the list or the like clamping the membrane to the framework and 4 the part of the framework above which the expansion part of the membrane is situated.

According to Fig. 1 the covering list 3 is arranged on the outside of the framework 1 perpendicular to the window surface 2 and clamped to the framework as by nailing, screwing or the like.

In Fig. 2 a further development of Fig. 1 is shown in which a bend is arranged also in the clamped portion of the membrane. Also the double window according to Fig. 4 is based on this principle. In the windows shown in these figures the membrane is provided with an expansion portion according to the invention.

In Fig. 3 the invention is shown as applied to the fixation of the membrane at any arbitrary part thereof, a list 3 being nailed or in other manner secured above the membrane in a groove in the framework corresponding to the list. On opposite sides of the list the membrane is bent upwardly in the shape of an arc in order to provide an expansion portion. The embodiment shown in Fig. 3 may, of course, also be applied for the fixation of the membrane along its edges, in which case the edge of the membrane is situated in or in the vicinity of the clamped portion of the membrane.

What I claim is:—

1. Window for greenhouses, hot-beds and the like, comprising a frame, a window pane consisting of a flexible transparent membrane having portions bent at substantially right angles to the window surface, and means for clamping a part of each of said bent portions to said frame so as to leave another part of each of said bent portions in an unclamped state between the window surface and said frame to allow for expansion and contraction of the window pane.

2. Window for greenhouses, hot-beds and the like, comprising a frame, two window panes consisting of flexible transparent membranes, and arranged on opposite sides of said frame leaving an air space between them, said membranes being provided with portions bent at substantially right angles to the window surfaces, and means for clamping a part of each of said bent portions of each window pane to said frame so as to leave another part of each of said bent portions in an unclamped state between the respective window surface and said frame to allow for expansion and contraction of the window panes.

3. Window according to claim 1 and wherein said bent portions are edge portions of the window pane.

4. Window according to claim 1, and wherein the window pane between its edges is bent to form a flexible pocket consisting of two portions bent at substantially right angles to the window surface and united by a rounded portion, said rounded portion being inserted and clamped in a rounded recess in a list of the frame so as to leave a part of said bent portions in an unclamped state between the window surface and said list to allow for expansion and contraction of the window pane.

5. Window according to claim 1, and wherein the window pane before mounting it in the frame has been shrunk by thermal treatment.

OLOF HJALMAR WICANDER.